United States Patent
Tan et al.

(10) Patent No.: US 11,657,506 B2
(45) Date of Patent: May 23, 2023

(54) SYSTEMS AND METHODS FOR AUTONOMOUS ROBOT NAVIGATION

(71) Applicant: General Electric Company, Schenectady, NY (US)

(72) Inventors: Huan Tan, Clifton Park, NY (US); Isabella Heukensfeldt Jansen, Niskayuna, NY (US); Gyeong Woo Cheon, Clifton Park, NY (US); Li Zhang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 898 days.

(21) Appl. No.: 16/293,972

(22) Filed: Mar. 6, 2019

(65) Prior Publication Data

US 2020/0285247 A1 Sep. 10, 2020

(51) Int. Cl.
*G06F 19/00* (2018.01)
*G06T 7/11* (2017.01)
(Continued)

(52) U.S. Cl.
CPC .............. *G06T 7/11* (2017.01); *G05D 1/0088* (2013.01); *G05D 1/0246* (2013.01);
(Continued)

(58) Field of Classification Search
CPC .. G05D 1/0246; G05D 1/0088; G06K 9/6271; G06K 9/00664; G06K 9/4628;
(Continued)

(56) References Cited

U.S. PATENT DOCUMENTS

| 5,111,401 A | 5/1992 | Everett, Jr. et al. |
| 6,243,622 B1 | 6/2001 | Yim et al. |

(Continued)

FOREIGN PATENT DOCUMENTS

| CN | 101984765 A | 3/2011 |
| CN | 204775952 U | 11/2015 |
| JP | 2007098567 A | 4/2007 |

OTHER PUBLICATIONS

Kronreif, Gernot, et al., "Integrated Robot Navigation in CAD Environment", Journal of ScienceDirect, IFAC Proceedings Volumes, vol. 30, Issue 14, Jul. 1997, (pp. 239-244, 6 total pages).

(Continued)

*Primary Examiner* — Abby Y Lin
*Assistant Examiner* — Sohana Tanju Khayer
(74) *Attorney, Agent, or Firm* — Buckley, Maschoff & Talwalkar LLC

(57) ABSTRACT

A method of robot autonomous navigation includes capturing an image of the environment, segmenting the captured image to identify one or more foreground objects and one or more background objects, determining a match between one or more of the foreground objects to one or more predefined image files, estimating an object pose for the one or more foreground objects by implementing an iterative estimation loop, determining a robot pose estimate by applying a robot-centric environmental model to the object pose estimate by implementing an iterative refinement loop, associating semantic labels to the matched foreground object, compiling a semantic map containing the semantic labels and segmented object image pose, and providing localization information to the robot based on the semantic map and the robot pose estimate. A system and a non-transitory computer-readable medium are also disclosed.

20 Claims, 2 Drawing Sheets

(51) Int. Cl.
*G05D 1/02* (2020.01)
*G06T 7/73* (2017.01)
*G05D 1/00* (2006.01)
*G06N 3/08* (2023.01)
*G06T 7/194* (2017.01)
*G06F 18/2413* (2023.01)
*G06N 3/045* (2023.01)
*G06V 10/764* (2022.01)
*G06V 10/82* (2022.01)
*G06V 10/44* (2022.01)
*G06V 20/10* (2022.01)

(52) U.S. Cl.
CPC ....... *G06F 18/24133* (2023.01); *G06N 3/045* (2023.01); *G06N 3/08* (2013.01); *G06T 7/194* (2017.01); *G06T 7/74* (2017.01); *G06T 7/75* (2017.01); *G06V 10/454* (2022.01); *G06V 10/764* (2022.01); *G06V 10/82* (2022.01); *G06V 20/10* (2022.01); *G06T 2207/20081* (2013.01); *G06T 2207/20084* (2013.01); *G06T 2207/30244* (2013.01)

(58) Field of Classification Search
CPC .................. G06N 3/0454; G06N 3/08; G06T 2207/20081; G06T 2207/20084; G06T 2207/30244; G06T 7/11; G06T 7/194; G06T 7/74; G06T 7/75
See application file for complete search history.

(56) References Cited

U.S. PATENT DOCUMENTS

| | | | |
|---|---|---|---|
| 7,211,980 | B1 | 5/2007 | Bruemmer et al. |
| 7,587,260 | B2 | 9/2009 | Bruemmer et al. |
| 9,858,712 | B2 | 1/2018 | Stathis |
| 2013/0033522 | A1* | 2/2013 | Calman .................. G06Q 30/06 345/633 |
| 2017/0132752 | A1* | 5/2017 | Aoyagi ................. G06T 19/006 |
| 2018/0137651 | A1* | 5/2018 | Levinshtein ............... G06T 9/20 |
| 2019/0026917 | A1* | 1/2019 | Liao .......................... G06T 7/60 |
| 2019/0051056 | A1* | 2/2019 | Chiu ........................ G06T 7/136 |
| 2019/0080467 | A1* | 3/2019 | Hirzer ....................... G06T 7/74 |
| 2019/0147245 | A1* | 5/2019 | Qi ........................ G06K 9/3233 382/103 |
| 2019/0213443 | A1* | 7/2019 | Cunningham ........... G06K 9/78 |
| 2019/0219401 | A1* | 7/2019 | Daniilidis ............... G06T 7/143 |
| 2019/0266418 | A1* | 8/2019 | Xu ....................... G06V 10/457 |
| 2020/0184678 | A1* | 6/2020 | Mukherjee .............. G06T 15/20 |
| 2020/0193637 | A1* | 6/2020 | Karasudani ........... G06T 11/203 |
| 2020/0250879 | A1* | 8/2020 | Foster .................. G05D 1/0276 |
| 2020/0364554 | A1* | 11/2020 | Wang ....................... G06N 3/08 |

OTHER PUBLICATIONS

Gasteratos, Antonios et al., "PRONTO: A system for mobile robot navigation via CAD model guidance", Microprocessors and Microsystems, Oct. 29, 2001, (pp. 17-26, 10 total pages).

* cited by examiner

SYSTEMS AND METHODS FOR AUTONOMOUS ROBOT NAVIGATION

BACKGROUND

Autonomous robot navigation requires a good localization and mapping component. A fully autonomous robot utilizes a dense mapping of the environment, which presents segmentation of objects in the environment. The robot can use such information to perform decision making, and complex mobile manipulation. Conventional sparse modeling algorithms execute quickly—for sparse environments the results can provide adequate robot localization. The accuracy of the conventional sparse modeling algorithm localization is impacted by the limited mapping and visualization input data. Conventional semi-dense environment algorithms can execute at a relatively slow pace, but are useful for some situations—for example, autonomous driving. However, the semi-dense information is not adequate to analyze the environment semantically. Conventional dense modeling algorithms are slow and require repeated processing of one single scene. Conventional dense modeling can have application in situations needing complex situational understanding and corresponding task planning.

Conventional environmental modeling systems describe features appearing on a two-dimensional (2D) image. Even with robust featuring matching, conventional 2D matching and optimization techniques result in errors that can affect the precision of the mapping transformation matrix.

DESCRIPTION

Figure 1:
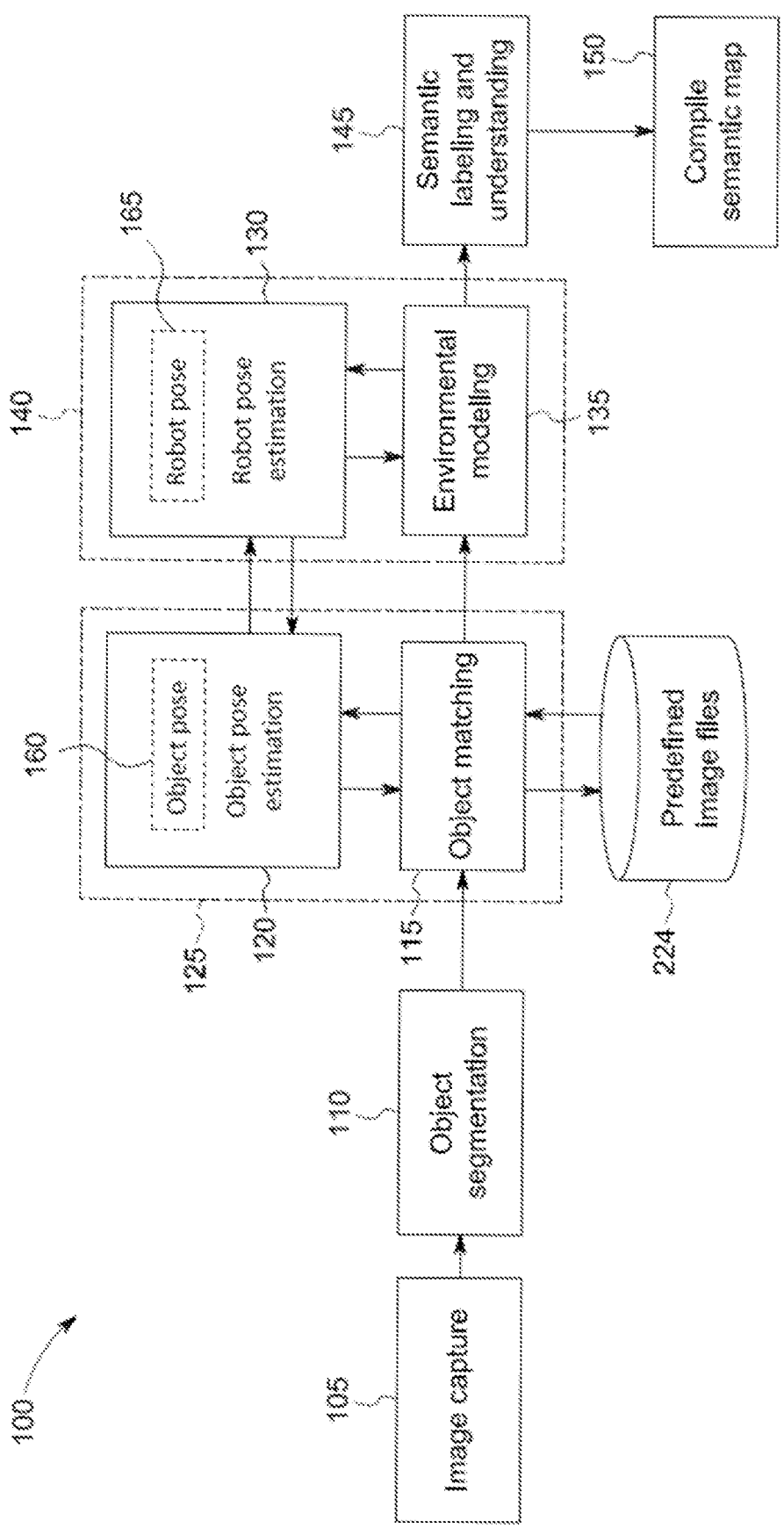
FIG. 1 illustrates a process for implementing autonomous robot navigation in accordance with embodiments.

Embodying systems and methods provide a dense modeling approach for environmental modeling for robot autonomous navigation based on a semantic map created by applying prebuilt image models to captured images of the robot's environment.

Embodying systems and methods create a dense and semantic map of the robot's environment using existing image files as models for recognition. These image files can be computer-aided design (CAD) models (2D, three-dimensional (3D) wireframe, 3D solid modeling), digital photographs, drawings, and the like. It should be readily understood that embodying systems and methods are not limited to any one image file type and/or nature. For convenience, the following discussion discloses systems and methods that use models from CAD image files. However, other implementations of image files are within the scope of this disclosure.

This system can utilize CAD models, match them to objects in the environment captured in images, and map them in the environment. Because the CAD models are dense, the resultant modeling from embodiments is dense as well. Using CAD models results in more robust pose estimation results, which yield increased triangulation accuracy over conventional feature-based matching and optimization techniques.

Embodying systems and methods execute significantly faster than conventional surface estimation and modeling approaches; and perform dense modeling faster than conventional dense modeling approaches. Embodying dense modeling approaches improve robot autonomous navigation by providing high resolution results coupled with fast execution speed.

In accordance with embodiments, techniques for object segmentation, object matching, object pose estimation, are applied together in an active relearning approach. Object segmentation/matching begins with capturing images of objects in the robot's environment—including, but not limited to assembly parts, industrial plants, power generation turbines, structures, obstacles, persons, etc.).

Various imaging technologies can be used to capture these environmental images. The imaging device can be implemented in the visual spectrum with black and white or color capabilities, or in other spectrums (e.g., infrared, microwave, millimeter, laser, x-ray, etc.). In some implementations, the imaging device can include depth sensing capability (e.g., a red/green/blue plus depth camera (RGB-D)).

Object Segmentation

In accordance with embodiments, object segmentation is achieved by applying a deep learning-based approach implemented in deep neural networks (DNN) to segment objects from the environment. During a model training process, an object is placed in the environment with annotated pixels. In accordance with embodiments, a foreground DNN performs foreground segmentation, a background DNN performs background segmentation, and a refinement DNN refines the segmentation results. These three neural networks combine to cooperatively create a neural network.

Adversarial training can train both the foreground and the background DNNs to recognize boundaries between the foreground and background portions of the images. These two DNNs actively identify the pixels of an input image as foreground elements and background elements.

An adversarial strategy is applied to maximize the score and/or probability of correct identification by the two DNNs. In accordance with implementations, Fisher's linear discriminant approach can be used as an adversarial strategy. The identification information is utilized to maximize the objective represented by equation 1:

$$J(w) = \frac{|m_1 - m_2|^2}{S_1^2 + S_2^2} \quad \text{(EQ. 1)}$$

Where, J(w) is the objective;

$m_1$ is the foreground identification from the foreground DNN;

$m_2$ is the background identification from the background DNN; and

S is the standard deviation.

By applying this approach, candidate objects can be segmented from the background. A refinement DNN is applied to these segmented objects to refine the segmented objects. The value of objective J(w) is used as one input of to the refinement DNN for further refinement.

Object Matching and Pose Estimation

After further refinement of the image segmentation by the refinement DNN is completed, 2D images of discrete regions of the captured image are available for identification. Identification can be achieved by matching predefined CAD models to the segmented 2D images. Utilizing CAD models reduces the time to identify matches between successive frames; removes false segmented objects; and provides accurate region of interests for pose estimation.

Pose estimation can be computed from the matched images identified using the CAD models. In accordance with embodiments, an iterative process is deployed to refine the pose estimation results. This iterative process includes projecting the CAD model image onto the 2D image; computing an error between the projected CAD model and the 2D image; refining the matching identification; and re-computing the object pose. This pose estimation loop can be limited by a predetermined threshold tolerance for the computed error. When the computed error is within the threshold, the loop can terminate.

In some implementations, the matching results can be provided to the CAD model library to refine the definition of and object's key features or points for future segmentation and matching. The refinement of the CAD model library can include applying the robot's viewing angle into the CAD model of the object. This implementation can have application where the robot is performing a repetitive task—for example, part picking from a bin, inspection of similar facilities or structures, etc.

Robot Pose Estimation

In accordance with embodiments, robot pose estimation can be done by computing an inverse transformation to find the robot pose 165 of the robot in the world frame (from the robot pose estimate viewpoint/perspective). The robot's world frame pose 165 can be used as the major localization results for autonomous navigation by the robot.

In accordance with embodiments, a localization iterative refinement loop is implemented to improve the localization results. The CAD model for identified objects among the segmented images are again projected onto the 2D images. The position of the model's projection is adjusted to account for both the object's and the robot's pose. Adjusting the model's pose can reduce any displacement and/or parallax error due to the angular differences in the object's pose, the robot's pose, and the CAD model's drawing perspective.

In accordance with embodiments, another matching sequence loop is implemented to quantify the error between a 2D segmented image of an object and the CAD model applied to the object for identification. The error will be used to compute an image Jacobian matrix. Then a Kalman Filter-based optimization approach is used to update the pose of the robot. The matched CAD models can be projected onto the 3D environment to describe the current environment. The robot's pose can be further refined by combining this projection with the robot pose estimation.

Semantic Labeling and Understanding

In accordance with embodiments, CAD models that match objects in the captured image are associated with semantic labels and their properties. A semantic map can be compiled from these semantic labels. The label for each object image can include a unique identifier (i.e., unique semantical name), a category, and attributes of the object (e.g., shape size, material, distance, etc.). The robot can further analyze the situational environment by applying the semantic map to achieve its navigational tasks.

FIG. 1 illustrates process 100 for implementing autonomous robot navigation in accordance with embodiments. An image of the robot's environment is captured, step 105. A deep learning-based approach is applied to the captured image to segment objects from the environment, step 110. A foreground segmentation DNN can perform foreground segmentation, and a background DNN can perform background segmentation on the captured image.

Segmented 2D images can be matched, step 115, to predefined image files (e.g., CAD models). Matched images are used to compute, step 120, object pose estimates 160.

The object pose estimate 160 can be refined, step 125, in an iterative estimation loop. An error can be calculated and used to compare the accuracy of the segmented 2D image to the image file. When the error is within a predetermined tolerance, iterative estimation loop 125 can be exited. In some implementations, the matching result can be used to update the predefined image file.

An inverse transformation can be computed, step 130, to obtain a robot pose estimate. The robot pose estimate can be in a world frame centric to the robot's viewpoint and/or perspective. This world frame can be used to obtain localization results used by the robot for autonomous navigation.

Environmental modeling is performed, step 135, to improve the localization results. This environmental modeling includes projecting the image file identified as matching the segmented image into the world frame. The projection is adjusted to account for the object's pose and the robot's pose in the world frame to create an updated world frame. The updated world frame is used to re-compute the robot pose estimate in step 130. Iterative refinement loop 140 can be repeated to improve the robot pose estimate.

In accordance with embodiments, the robot pose estimate can be provided to iterative estimation loop 125, where object matching (step 115) and object pose estimation (step 120) are repeated. This subsequent pass through iterative estimation loop 125 can use the updated image file generated during a previous pass through the iterative estimation loop. Loop 125 can be exited the results are within the predetermined threshold. The updated object pose estimation and updated object matching are provided to iterative refinement loop 140. When the results of the iterative refinement loop are within a second predetermined accuracy threshold, process 100 continues to step 145.

At step 145, objects segmented from the captured image that match the image file are associated with semantic labels. The semantic label of each object can include a unique identifier, a category, and object attributes. A semantic map can be compiled, step 150, from these semantic labels. The robot can achieve its autonomous navigation by applying the semantic map to it environment.

Figure 2:
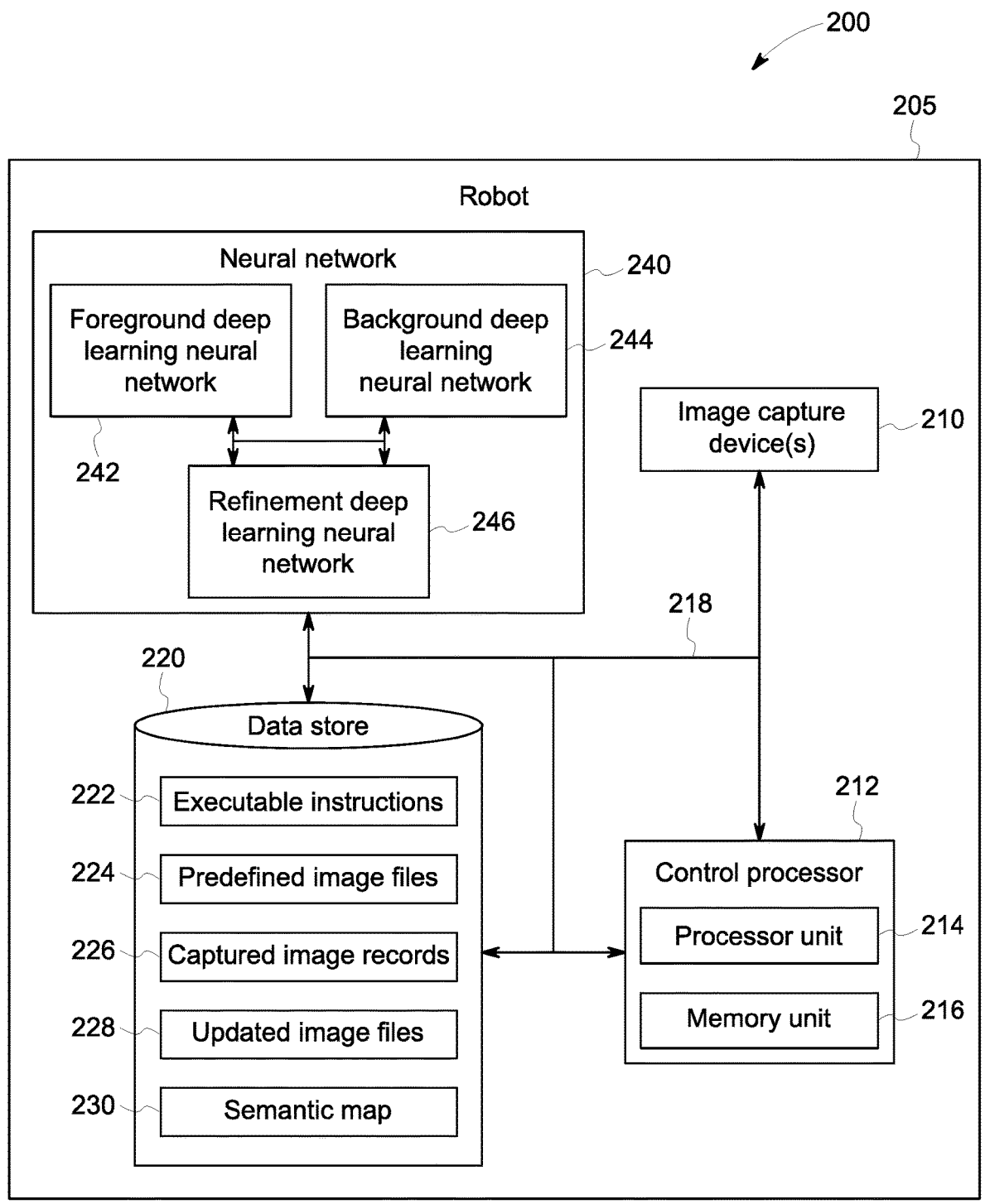
FIG. 2 illustrates a system for implementing autonomous robot navigation in accordance with embodiments.

FIG. 2 illustrates system 200 for implementing autonomous robot navigation in accordance with embodiments. System 200 can be implemented in robot 205. Robot 205 can include image capture device(s) 210. The robot can include other systems, subsystems, and components (not shown) needed to achieve the robot's task.

Control processor 212 can include processor unit 214 and memory unit 216. The control processor can be in communication with data store 220, and other elements of system 220, across data/control bus 218. Processor unit 214 can execute executable instructions 222, which cause the processor to perform segmentation, matching, and pose estimation in accordance with embodiments. Memory unit 216 can provide the control processor with local cache memory.

In addition to executable instructions 222, data store 220 can include predefined image files 224, captured image records 226, updated image file records 228, and semantic map 230. Neural network 240 can include foreground DNN 242, background DNN 244, and refinement DNN 246.

Embodying systems and methods provide a localization pose result for autonomous robotic navigation. Embodying systems and methods perform dense modeling to achieve fast object matching with a reduction in false segmentation to provide a pose estimation that incorporates semantic understanding with greater accuracy than conventional approaches.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as a method of segmenting captured images using prebuilt CAD models to achieve autonomous robot navigation based on semantic mapping, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method of robot autonomous navigation in an environment, the method comprising:
   capturing an image of the environment;
   segmenting the captured image to identify one or more foreground objects and one or more background objects;
   determining a match between one or more of the foreground objects to one or more predefined image files, at least one of the one or more predefined image files comprising a three-dimensional (3D) computer-aided design (CAD) model comprising: a wireframe model or a solid modeling model;
   estimating an initial object pose for the one or more foreground objects by implementing a first iterative estimation loop, the first iterative estimation loop comprising:
      projecting the 3D CAD model onto the captured image, computing an error between the projected 3D CAD model and the captured image, refining the determination of the match based on the computed error, and re-estimating the initial object pose;
   determining a robot pose estimate by applying a robot-centric environmental model to the foreground object pose estimate by implementing a second iterative estimation loop;
   determining a subsequent object pose estimate based an updated segmented image comprising the initial object pose estimate and the robot pose estimate via a third iterative estimation loop until an error between the projected 3D CAD model and the updated segmented image is less than a threshold value;
   associating semantic labels to the matched foreground object;
   compiling a semantic map containing the semantic labels and subsequent object pose in the updated segmented image; and
   providing localization information to the robot based on the semantic map and the robot pose estimate.

2. The method of claim 1, including:
   the first iterative estimation loop performing the matching and object pose estimation; and
   terminating the first iterative estimation loop based on a determination that a comparison between a segmented image and the predefined image file is within a predetermined tolerance.

3. The method of claim 1, including projecting the predefined image file determined to be a match to adjust for the segmented object pose.

4. The method of claim 1, including terminating the second iterative estimation loop based on a determination that a result of the second iterative estimation loop is within a predetermined tolerance.

5. The method of claim 1, including performing a model training process to train one or more deep neural networks by placing an object within the environment, the object having annotated pixels.

6. The method of claim 1, including performing an adversarial training process to train one or more deep neural networks to recognize boundaries between the one or more foreground and the one or more background objects.

7. The method of claim 1, including refining the segmented image using a deep neural network.

8. A non-transitory computer-readable medium having stored thereon executable instructions when executed by a processor unit cause the processor unit to perform a method of autonomous robot navigation, the method comprising:
   capturing an image of the environment;
   segmenting the captured image to identify one or more foreground objects and one or more background objects;
   determining a match between one or more of the foreground objects to one or more predefined image files, at least one of the one or more predefined image files comprising a three-dimensional (3D) computer-aided design (CAD) model comprising: a wireframe model or a solid modeling model;
   estimating an initial object pose for the one or more foreground objects by implementing a first iterative estimation loop, the first iterative estimation loop comprising:
      projecting the 3D CAD model onto the captured image, computing an error between the projected 3D CAD model and the captured image, refining the determination of the match based on the computed error, and re-estimating the initial object pose;
   determining a robot pose estimate by applying a robot-centric environmental model to the foreground object pose estimate by implementing a second iterative estimation loop;
   determining a subsequent object pose estimate based an updated segmented image comprising the initial object pose estimate and the robot pose estimate via a third iterative estimation loop until an error between the projected 3D CAD model and the updated segmented image is less than a threshold value;
   associating semantic labels to the matched foreground object;
   compiling a semantic map containing the semantic labels and subsequent object pose in the updated segmented image; and providing localization information to the robot based on the semantic map and the robot pose estimate.

9. The non-transitory computer-readable medium of claim 8, the executable instructions further configured to cause the processor unit to perform the method, including:
the first iterative estimation loop performing the matching and object pose estimation; and
terminating the first iterative estimation loop based on a determination that a comparison between a segmented image and the predefined image file is within a predetermined tolerance.

10. The non-transitory computer-readable medium of claim 8, the executable instructions further configured to cause the processor unit to perform the method, including projecting the predefined image file determined to be a match to adjust for the segmented object pose.

11. The non-transitory computer-readable medium of claim 8, the executable instructions further configured to cause the processor unit to perform the method, including terminating the iterative refinement loop based on a determination that a result of the second iterative estimation loop is within a predetermined tolerance.

12. The non-transitory computer-readable medium of claim 8, the executable instructions further configured to cause the processor unit to perform the method, including performing a model training process to train one or more deep neural networks by placing an object within the environment, the object having annotated pixels.

13. The non-transitory computer-readable medium of claim 8, the executable instructions further configured to cause the processor unit to perform the method, including performing an adversarial training process to train one or more deep neural networks to recognize boundaries between the one or more foreground and the one or more background objects.

14. The non-transitory computer-readable medium of claim 8, the executable instructions further configured to cause the processor unit to perform the method, including refining the segmented image using a deep neural network.

15. A system for autonomous robot navigation, the system comprising:
an image capture device;
a data store having executable instructions stored thereon;
a neural network in communication with a processor unit and the data store;
the executable instructions when executed by the processor unit cause the processor unit to perform a method comprising:
capturing an image of the environment with the image capture device;
segmenting the captured image to identify one or more foreground objects using a foreground deep neural network (DNN) and to identify one or more background objects using a background DNN, the foreground and the background DNN located within the neural network;
determining a match between one or more of the foreground objects to one or more predefined image files, at least one of the one or more predefined image files comprising a three-dimensional (3D) computer-aided design (CAD) model comprising: a wireframe model or a solid modeling model;
estimating an initial object pose for the one or more foreground objects by implementing a first iterative estimation loop, the first iterative estimation loop comprising:
projecting the 3D CAD model onto the captured image, computing an error between the projected 3D CAD model and the captured image, refining the determination of the match based on the computed error, and re-estimating the initial object pose;
determining a robot pose estimate by applying a robot-centric environmental model to the foreground object pose estimate by using a refinement DNN to implement a second iterative estimation loop, the refinement DNN located within the neural network;
determining a subsequent object pose estimate based an updated segmented image comprising the initial object pose estimate and the robot pose estimate via a third iterative estimation loop until an error between the projected 3D CAD model and the updated segmented image is less than a threshold value;
associating semantic labels to the matched foreground object;
compiling a semantic map containing the semantic labels and subsequent object pose in the updated segmented image; and
providing localization information to the robot based on the semantic map and the robot pose estimate.

16. The system of claim 15, the executable instructions further configured to cause the processor unit to perform the method, including:
the first iterative estimation loop performing the matching and object pose estimation; and
terminating the first iterative estimation loop based on a determination that a comparison between a segmented image and the predefined image file is within a predetermined tolerance.

17. The system of claim 15, the executable instructions further configured to cause the processor unit to perform the method, including projecting the predefined image file determined to be a match to adjust for the segmented object pose.

18. The system of claim 15, the executable instructions further configured to cause the processor unit to perform the method, including terminating the second iterative estimation loop based on a determination by the refinement DNN that a result of the second iterative estimation loop is within a predetermined tolerance.

19. The system of claim 15, the executable instructions further configured to cause the processor unit to perform the method, including performing a model training process to train one or more deep neural networks by placing an object within the environment, the object having annotated pixels.

20. The system of claim 15, the executable instructions further configured to cause the processor unit to perform:
a first adversarial training process to train the foreground DNN to recognize boundaries between the one or more foreground objects; and
a second adversarial training process to train the background DNN to recognize boundaries between the one or more background objects.

* * * * *